(12) United States Patent
Chen (10) Patent No.: US 11,841,095 B2
(45) Date of Patent: Dec. 12, 2023

(54) TELESCOPIC HOSE AND PROCESSING TECHNOLOGY THEREOF

(71) Applicant: Jinhua Chunguang Technology Co., Ltd, Zhejiang (CN)

(72) Inventor: Zhengming Chen, Zhejiang (CN)

(73) Assignee: Jinhua Chunguang Technology Co., Ltd, Jinhua (CN)

( * ) Notice: Subject to any disclaimer, the term of this patent is extended or adjusted under 35 U.S.C. 154(b) by 107 days.

(21) Appl. No.: 17/489,739

(22) Filed: Sep. 29, 2021

(65) Prior Publication Data

US 2022/0325829 A1 Oct. 13, 2022

(30) Foreign Application Priority Data

Apr. 7, 2021 (CN) .......................... 202110373379.0

(51) Int. Cl.
*F16L 11/00* (2006.01)
*F16L 11/118* (2006.01)
*F16L 11/115* (2006.01)
*H01B 1/02* (2006.01)
*H01B 7/00* (2006.01)

(52) U.S. Cl.
CPC ......... *F16L 11/1185* (2013.01); *F16L 11/115* (2013.01); *H01B 1/026* (2013.01); *H01B 7/0072* (2013.01)

(58) Field of Classification Search
CPC ..... F16L 11/1185; F16L 11/115; H01B 1/026; H01B 7/0072
USPC .......................... 138/121, 122, 129, 131, 133
See application file for complete search history.

(56) References Cited

U.S. PATENT DOCUMENTS

| | | | | |
|---|---|---|---|---|
| 4,230,899 A * | 10/1980 | Kanao | ...................... | A47L 9/24 174/130 |
| 4,693,324 A * | 9/1987 | Choiniere | ................. | A47L 9/24 138/122 |
| 5,182,147 A * | 1/1993 | Davis | ..................... | F16L 11/115 428/377 |
| 5,601,119 A * | 2/1997 | Kanao | ................... | F16L 11/127 138/133 |
| 5,778,941 A * | 7/1998 | Inada | ...................... | F16L 11/16 138/132 |
| 6,024,132 A * | 2/2000 | Fujimoto | ................ | F16L 11/15 138/121 |

(Continued)

FOREIGN PATENT DOCUMENTS

| | | |
|---|---|---|
| CN | 105695888 A | 6/2016 |
| CN | 206175866 U | 5/2017 |

*Primary Examiner* — James F Hook (57) ABSTRACT

The present invention discloses a telescopic hose and the process technology thereof. The telescopic hose comprises an elastic support member that can be configured to conduct strong electricity; the support member comprises a first wire and a second wire, and the first wire and the second wire are arranged in a double helix structure in cooperation with each other; a hose wall that is wrapped around the outer side of the support member, and at least part of the hose wall between the first wire and the second wire forms a corrugated portion. Through the setting of the above structures, the hose can not only conduct strong electricity, but also stretch back and forth and turn at any angle. In addition, the hose structure is relatively simple, the amount of gas and liquid passing per unit time is larger.

9 Claims, 3 Drawing Sheets

(56) References Cited

U.S. PATENT DOCUMENTS

| | | | | |
|---|---|---|---|---|
| 6,024,134 | A * | 2/2000 | Akedo | F16L 11/115 |
| | | | | 138/132 |
| 2009/0050227 | A1 | 2/2009 | Smith | |
| 2009/0277525 | A1* | 11/2009 | Jourdan | B29C 48/12 |
| | | | | 138/122 |
| 2010/0037973 | A1* | 2/2010 | Smith | F16L 11/115 |
| | | | | 138/131 |
| 2020/0056671 | A1* | 2/2020 | Akada | C23C 28/023 |
| 2021/0164083 | A1* | 6/2021 | Akada | C22C 38/02 |
| 2021/0284501 | A1* | 9/2021 | Kodeck | D07B 5/006 |

\* cited by examiner

TELESCOPIC HOSE AND PROCESSING TECHNOLOGY THEREOF

CROSS REFERENCE TO RELATED APPLICATIONS

The present application claims the benefit of Chinese Patent Application No. 202110373379.0 filed on Apr. 7, 2021, the contents of which are incorporated herein by reference in their entirety.

TECHNICAL FIELD

The present invention relates to the technical field of hose industry, and more particularly to a telescopic hose and a process technology thereof.

BACKGROUND

In the prior art, telescopic hoses that can be energized are generally intertwined with ordinary steel wires or copper-plated steel wires to achieve the electric conduction of telescopic hoses. Although this technical solution can realize the conduction of strong electricity of the telescopic hose, the hose has both wires and support members, and the hose body is coated with multiple wires. Since the part that is coated with wires cannot be stretched, a longer inner spiral folded layer is required to achieve a certain stretch ratio, making the hose wall thicker; when the outer diameter is same, the inner hole of the hose is relatively small, which affects the gas-liquid flow rate and reduces the utilization efficacy of the hose to a certain extent; furthermore, due to a heavier hose body, it not only increases the production cost, but also affects the user experiences.

SUMMARY

In order to overcome the shortcomings of the prior art, the present invention provides a telescopic hose with a simple structure and a large gas-liquid flow.

To achieve the above object, the present invention adopts the following technical solutions:

A telescopic hose, including:
  an elastic support member that is configured to conduct strong electricity; the support member comprises a first wire and a second wire, and the first wire and the second wire are arranged in a double helix structure in cooperation with each other;
  a hose wall that is wrapped around the outer side of the support member, and at least part of the hose wall between the first wire and the second wire forms a corrugated portion;

The cooperation of the first wire and the second wire and the setting of a double helix structure can be used to provide power supply and support the hose wall, to make the hose wall, the first wire and the second wire to cooperate with each other to form a hose that can be stretched back and forth and bent, and make it possible to use a flexible wire directly to support the hose wall, so that the prepared hose can not only conduct strong electricity to realize the supply of power, but also make the hose to stretch back and forth and turn at any angle. In addition, the hose structure is relatively simple, which can ensure a relatively large inner diameter of the hose with the same outer diameter, so that the amount of gas and liquid passing per unit time is larger, moreover, the hose occupies a small space, so it is more convenient to use; and with a lower cost, it is conducive to production, processing and promotion.

Further, when the hose is in a contraction state, a corrugated portion is formed on the inner side of the hose wall, and two corrugated portions located on both sides of the second wire abut against each other, while a gap is reserved between two corrugated portions located on both sides of the first wire.

Further, the first wire comprises an inner core, a conductive layer arranged on the inner core, and an insulating layer that is wrapped outside the conductive layer; Through the setting of the above structures, the wires have the conductive ability, and no electric leakage will occur.

Further, the inner core comprises at least the following components: carbon, manganese, sulfur, phosphorus and silicon; the mass percents of components in the inner core are:
  carbon 0.42-0.5%;
  manganese 0.5-0.8%;
  sulfur $\le \ge 0.035\%$;
  phosphorus $\le \ge 0.035\%$;
  silicon 0.17-0.37%.

Through the setting of the above structure, the wire can support the radial direction in which the telescopic hose is supported, and has sufficient elasticity and toughness; and the structure is simple, so that the telescopic hose can be bent at any angle without mounting other support member or elastic member, making the bending more convenient and labor-saving, and more cost-saving, and the hose is thinner and lighter.

Further, the diameter of the inner core is in the range of 0.935 mm to 0.965 mm; through the setting of the above structure, it ensures that the inner core has a sufficient strength and a sufficient elasticity. The elasticity is moderate, and the bending is more labor-saving.

Further, the thickness of the conductive layer is in the range of 0.035 mm to 0.065 mm; through the setting of the above structure, it ensures that the conductive layer has a good electrical conductivity and will not affect the elasticity of the inner core; and ensures that the inner core can stretch back and forth without damaging the conductive layer.

Further, the copper content in the conductive layer is $\ge 99.5\%$; through the setting of the above structure, the wire has a sufficient conductivity and can better conduct strong electricity, which is not easy to lose during transmission.

Further, the conductive layer is made of a copper metal material and is formed on the inner core through one or more of the processes of electroplating, coating, hot casting, hot dipping or electroforming; making the processing more conveniently and efficiently.

Further, the insulating layer is made of a rubber material.

The present invention further provides a process technology of a telescopic hose, comprising:
  S1, making a first wire and a second wire, arranged in a double helix structure to form a support member;
  S2, stretching and unfolding the support member, and wrapping an rubber strip around the outer side of the first wire and the second wire to form a hose wall;
  S3, releasing the support member so that the support member shrinks under the action of own elastic force and a corrugated portion is formed on the inner side of the hose wall.

In summary, in the present invention, through the setting of the above structures, the hose can not only conduct strong electricity, but also stretch back and forth and turn at any angle. In addition, the hose structure is relatively simple, the amount of gas and liquid passing per unit time is larger; furthermore, the hose has a low mass and is more convenient to use; and with a lower cost, it is conducive to production, processing and promotion.

DETAILED DESCRIPTION

As shown in FIGS. 1 to 4, a telescopic hose comprises a hose wall 3, a first wire 1 and a second wire 2. Both the first wire 1 and the second wire 2 are provided in a spiral structure, which are flexible and mounted in the hose wall in a double helix structure in cooperation with each other, to form a double helix skeleton (i.e., a support member); the hose wall 3 is formed by an encapsulation process. Specifically, the PVC material is made into rubber strips, then the rubber strips are spirally wound and wrapped around the first wire and second wire mounted in a double helix structure along the spiral pattern and direction of the double helix skeleton, and the adjacent rubber strips are at least partially overlapped each other to form a hose wall 3; before the encapsulation process, the first wire 1 and second wire 2 that are mounted in a double helix structure need to be stretched and unfolded, and then the rubber strips are wrapped around the outer side of the first wire and the second wire. When a hose wall is formed, the first wire and second wire will be bonded with the rubber strips forming the hose wall, so that the hose wall and the first wire and second wire are connected and fixed together; and when the first wire and second wire are not subjected to an external force any longer, the first wire and second wire will shrink under the action of their own elastic force, and the hose wall located between the first wire and the second wire will be folded to form a corrugated portion 31; and the first wire 1, the second wire 2 and the hose wall 3 will combine to become a telescopic hose.

That is, the process technology of a telescopic hose, at least comprising:
S1, making a first wire and a second wire, arranged in a double helix structure to form a support member;
S2, stretching and unfolding the support member, and wrapping an rubber strip around the outer side of the first wire and the second wire to form a hose wall;
S3, releasing the support member so that the support member shrinks under the action of own elastic force and a corrugated portion is formed on the inner side of the hose wall.

Figure 4:
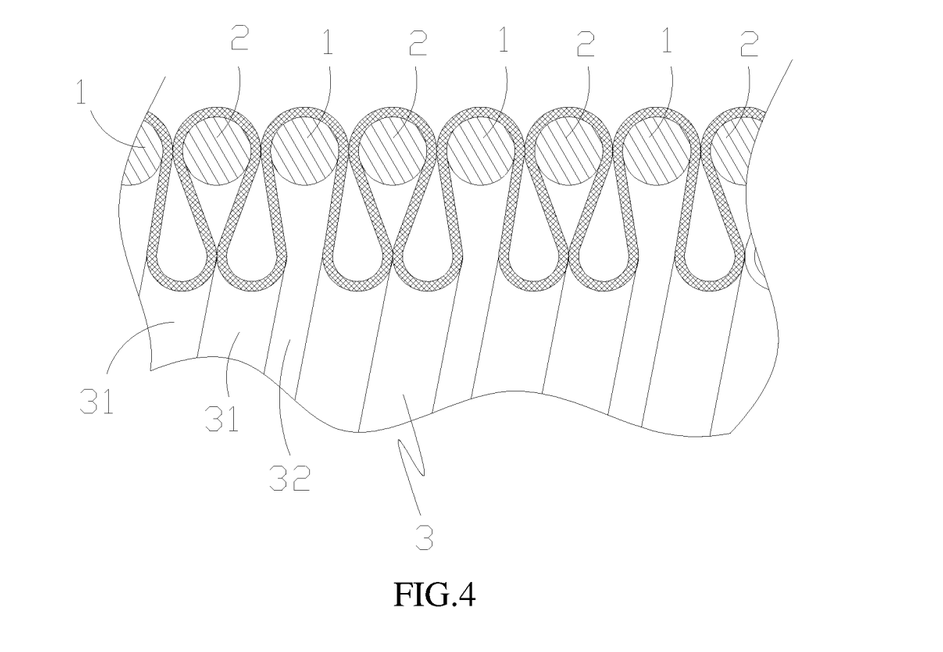
FIG. 4 is a partial cross-sectional view of a telescopic hose in a contraction state in the present invention.

Further, when the hose in this application is in a contraction state, a corrugated portion 31 is formed on the inner side of the hose wall 3, and two corrugated portions 31 located on the left and right sides of the second wire 2 abut against each other, while a gap 32 is reserved between two corrugated portions located on the left and right sides of the first wire 1.

Figure 1:
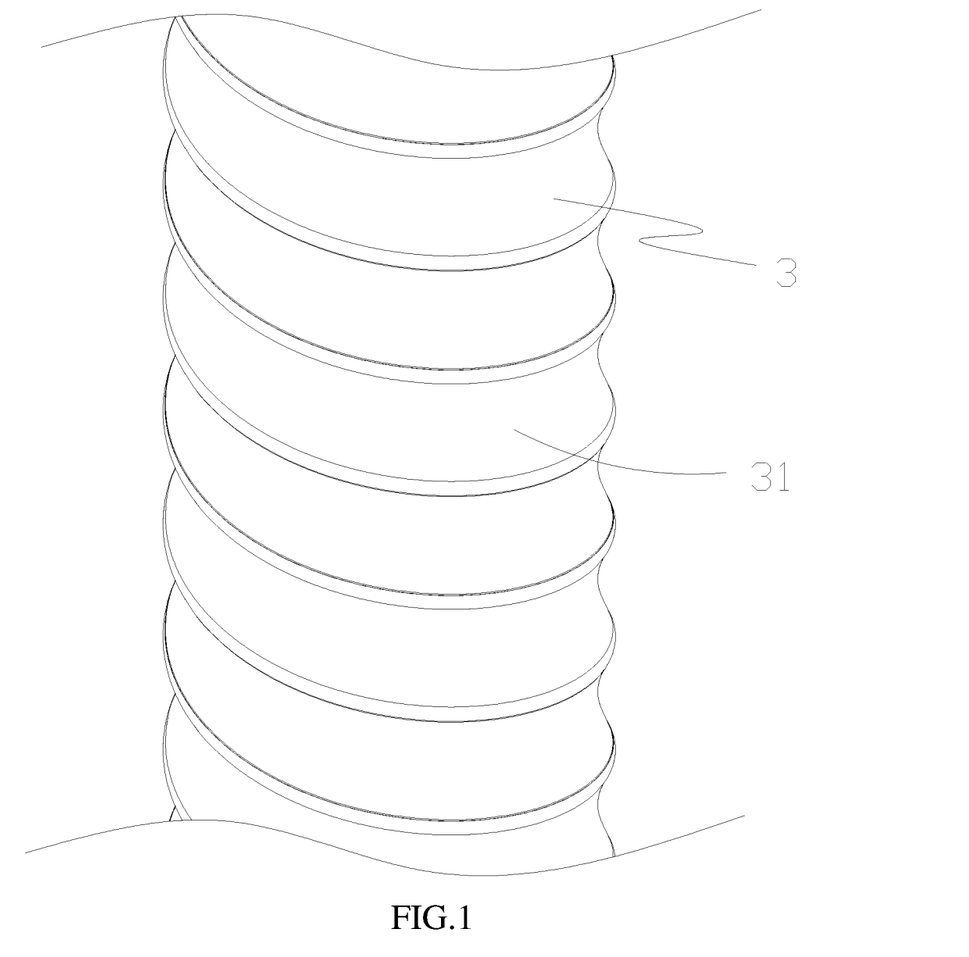
FIG. 1 is a partial three-dimensional schematic view of a telescopic hose in a stretching state in the present invention.
Figure 2:
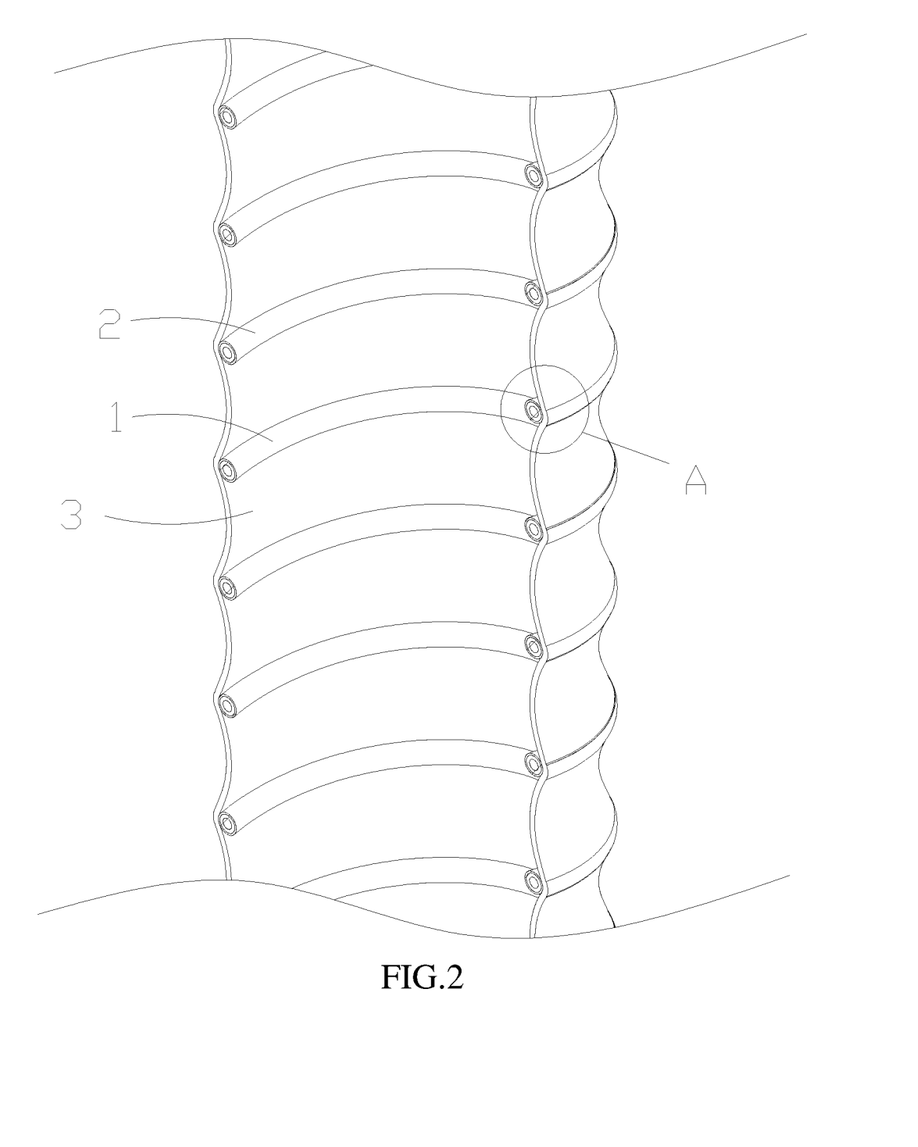
FIG. 2 is a partial three-dimensional sectional view of a telescopic hose in a stretching state in the present invention.
Figure 3:
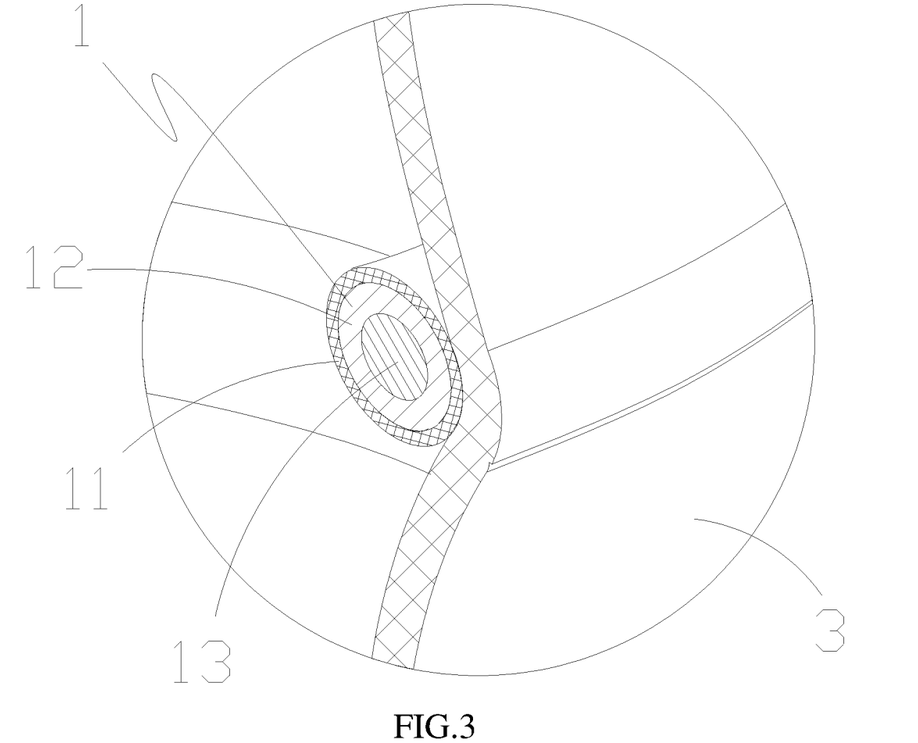
FIG. 3 is an enlarged view of A in FIG. 2.

Specifically, the first wire 1 includes an insulating layer 11, a conductive layer 12 and an inner core 13. The inner core 13 is a special steel wire with sufficient rigidity, so that the telescopic hose made has sufficient radial strength, and is not easy to be flattened; in addition, it has sufficient elasticity and toughness, so that the telescopic hose can be stretched back and forth and bent arbitrarily, and is not easy to be damaged. Furthermore, the wires can not only realize the electric conduction functions, but also support the telescopic hose to prevent from deformation; and the hose can be bent arbitrarily, and has excellent elasticity, etc. It does not need to mount additional springs or support members for support, so it is cost-saving; moreover, the telescopic hose occupies a small space and is lighter, which avoids the problem of mutual crowding and interference caused by the installation of springs or support members and wires together, making the bending of the flexible hose more easily and labor-saving. The diameter of the inner core is 0.935-0.965 mm, preferably 0.957 mm; the conductive layer 12 is provided outside the inner core 13, and the conductive layer is made of copper. The conductive layer can be attached to the inner core by electroplating, cladding, hot casting/dipping and electroforming, etc., so that the copper content of the conductive layer is greater than or equal to 99.5%. The thickness of the conductive layer is between 0.035 mm and 0.065 mm, preferably 0.043 mm, so that the wire has excellent conductivity and the conducive layer will not affect the stretching and bending of the inner core; the insulating layer 11 is wrapped on the outer side of the conductive layer 12 and is made of a rubber material, playing a role of insulation; moreover, the wires are easier to bond with the hose wall 3, making the more secure fixation and higher structural strength. The structure and material of the second wire 2 are the same as those of the first wire 1.

Further, in the steel wire used to make inner core 13, in addition to iron element, other components and the mass percentages of each component are shown in the table below.

| | |
|---|---|
| Carbon (C) | 0.42-0.5% |
| Manganese (Mn) | 0.5-0.8% |
| Sulfur (S) | ≤0.035% |
| Phosphorus (P) | ≤0.035% |
| Silicon (Si) | 0.17-0.37% |

The conductive layer 12 is cladded on the inner core 13 to form a whole (i.e., copper-clad steel), which has the following characteristics:

| Item | Unit | Standard |
|---|---|---|
| Wire diameter | mm | 1.00 + 0.02/−0.02 |
| Tensile strength | Mpa | 1200-1300 |
| Resistance | Ω/m | ≤0.10 |

In the application, for the inner core 13, by adjusting the mass percentage of carbon, manganese, sulfur, phosphorus, and silicon in the steel wire, and wrapping the conductive layer 12 and insulating layer 11 outside of the inner core, to make the first wire 1 and the second wire 2, so that the first wire and the second wire can not only realize the electric conduction functions, but also support the telescopic hose to prevent from deformation; and the hose can be bent arbitrarily, and has excellent elasticity, etc. It does not need to mount additional springs or support members for support, so it is cost-saving; moreover, the telescopic hose made has a lower mass and is lighter, which avoids the problem of mutual crowding and interference caused by the installation of springs or support members and wires together, making the bending of the flexible hose more easily and labor-saving.

The applicant also conducts tests as shown in the following tables 1, 2 and 3, to test that various parameters of the product in this application meet the technical standards (in the experiments, the product refers to a telescopic hose in this application; the comparison sample is an existing similar product).

TABLE 1

| Experiment Purpose | Type test | | | Test Result/ | Test environment Indoor temperature (° C.) 23-27 Indoor relative humidity (%) 63 |
|---|---|---|---|---|---|
| Test Item | Test Method | Standard | Sample No. | Phenomenon | Judgment |
| Tensile strength | Take a steel wire with a length of 100-200 mm, fasten both ends of the steel wire on the two fixtures of a testing machine, run the machine to measure the strength of the steel wire. | 1200-1300 Mpa | Product 1# Product 2# Comparator 1# Comparator 2# | 1250 Mpa 1260 Mpa 1195 Mpa 1205 Mpa | Pass Pass Fail Pass |
| Resistance test | Take 1 meter of rib strip to measure the resistance at both ends. | ≤0.1 Ω/m | Product 1# Product 2# Comparator 1# Comparator 2# | 92.36 mΩ 91.21 mΩ 103.56 mΩ 101.71 mΩ | Pass Pass Fail Fail |
| Size 1 | Measure the outer diameter of a copper-clad steel using a Vernier caliper | 1.0 ± 0.02 | Product 1# Product 2# Comparator 1# Comparator 2# | 1.01 0.98 0.96 0.97 | Pass Pass Fail Fail |

TABLE 2

| Experiment Purpose | Type test | | | Test Result Scrap facing | | | Test environment Indoor temperature (° C.) 23-27 Indoor relative humidity (%) 63 | |
|---|---|---|---|---|---|---|---|---|
| Test Item | Test Method | Standard | Sample No.-Stake No. | the direction of rotation | Degumming | Hole/ fracture | Downtime | Judgment |
| External wear | Place an entire hose or a part with a suitable length in an ambient temperature of 20-27° C. for more than 1 hour. Fix one end of the hose on the pulling end of the testing machine, and bear a weight of 1.13 Kg through a pulley on the other end. Allow the hose to pass through a pulley with 120-mesh (3M-U261) sandpaper at a rate of 20 rpm. | 350 | Product 1-1# Product 1-2# Comparator 1-1# Comparator 1-2# | ↑ ↓ ↑ ↓ | / / / / | / / / / | 400 400 345 325 | Pass Pass Fail Fail |
| Horizontal bending | The test sample is an entire hose or a part with a suitable length. Place the sample in an ambient temperature of 20-27° C. for more than 1 hour. Fix one end of the hose on a clamping position of a horizontal bending tester, and bear a weight of 4.536 Kg on the other end; let the hose lift up and down evenly at a speed of 36 ± 1 rpm. The weight should be in a free hanging state throughout the cycle. | 20000 | Product 1-8# Product 1-9# Comparator 1-8# Comparator 1-9# | ↑ ↓ ↑ ↓ | / / / / | / / / / | 26000 26000 21000 19987 | Pass Pass Pass Fail |

TABLE 2-continued

|  |  |  |  | Test environment |  |  |  |  |
|---|---|---|---|---|---|---|---|---|
|  |  |  |  | Indoor temperature (° C.) 23-27 Indoor relative humidity (%) 63 | | | | |
|  |  |  |  | Test Result | | | | |
| Experiment Purpose Test Item | Test Method | Type test Standard | Sample No.-Stake No. | Scrap facing the direction of rotation | Degumming | Hole/fracture | Downtime | Judgment |
| Vertical lifting | Fix one end of a sample plate on a pivot arm of a testing machine. The distance between the pivot arm shaft and the hose extending into the rigid part is 300 ± 5 mm, and the pivot arm can be raised from the horizontal position by 40° ± 1°. Hang a 5 kg weight on the other end of the hose, so that the pivot arm is in a horizontal position, and the weight is supported to not stretch the hose. Allow the weight to slide down the slope at a maximum deflection angle of 3°, and raise and lower the pivot arm at a speed of 10 ± 1 r/min. After testing for 2,500 cycles, rotate the fixed end of the hose by 90°, then continue a test for 2,500 cycles. Repeat each test at other two positions of 90°. | 10000 | Product 1-1# Product 1-2# Comparator 1-1# Comparator 1-2# | ↑ ↓ ↑ ↓ | / / / / | / / / / | 12000 12000 10500 9996 | Pass Pass Pass Fail |
| Cold and hot aging | Take a sample plate with a length of 0.61 m and place it at an ambient temperature of 20-27° C. for more than 1 hour. Bend the hose into a "U" shape, and tie the two ends of the hose together at 25 mm. Place the cooled hose in a test chamber of 65° C. for drying for 3 hours, then place the hose at −20° C. and freeze for 3 hours, and then take it out and quickly repeat a 360° bending test for 3 times, each bending test lasts 1 second. Check whether the hose is damaged. It is regarded as a cycle, and a total of 10 cycles will be performed. | 10 | Product 1# Product 2# Comparator 1# Comparator 2# | / / / / | / / / Yes | No No Yes Yes | 10 10 8 9 | Pass Pass Fail Fail |
| Puncture test | Take a sample plate with a length of 0.61 m and bend it up, place it in a 1% sodium chloride solution, apply 1 KV voltage to the wires and medium for 1 min. check whether the hose is broken; | No holes or breaks | Product 1# Comparator 1# | No holes or breaks of hose Holes or breaks of hose | Pass Fail | | | |
| High temperature test | Take three complete hoses and place them in an oven at 70° C. for 7 hours, and check if the hoses are broken. | No holes or breaks | Product 1#/2#/3# Comparator 1#/2#/3# | No holes, breaks or aging of hose Holes, breaks or aging of hose | Pass Fail | | | |
| Temperature rise test | Take an entire hose, connect two wires and connect them to a sliding rheostat, adjust the voltage to 120 V, 60 Hz, 1 A, and gradually record the temperatures of each point of the hose from the original temperature to a stable temperature without increase, ≤35° C. | Temperature rise ≤35° C. | Product 1# Product 2# Comparator 1# Comparator 1# | 28° C. 30° C. 36° C. 37° C. | Pass Pass Fail Fail | | | |

TABLE 2-continued

| | | | | Test environment |
| --- | --- | --- | --- | --- |
| | | | | Indoor temperature (° C.) 23-27 Indoor relative humidity (%) 63 |
| | | | | Test Result |
| Experiment | Type test | | Scrap facing | |
| Purpose Test Item | Test Method | Standard | Sample No.-Stake No. | the direction of rotation | Degumming | Hole/fracture | Downtime | Judgment |
| Leakage current test | Take a sample plate with a length of 0.61 m and bend it up, place it in a 1% sodium chloride solution, apply 1 KV voltage to the wires and medium for 1 min. Measure the leakage current from the liquid. | Leakage current ≤ 0.5 mA | Product 1# Product 2# Comparator 1# Comparator 1# | 0.1 mA 0.2 mA 0.4 mA 0.6 mA | Pass Pass Pass Fail | | | |

TABLE 3

| | | | | Test environment | |
| --- | --- | --- | --- | --- | --- |
| | | | | | Indoor temperature (° C.) 23-27 Indoor relative humidity (%) 63 |
| Experiment Purpose Test Item | Type test | | | Test Result/ Phenomenon | Judgment |
| | Test Method | Standard | Sample No. | | |
| Stretch ratio | Take a hose with a length of 500 mm, hang it with a 4.5N tension, and measure the length of the hose to calculate the stretch ratio. | 1:3.2 ≤ x ≤ 1:4 | Product 1# Product 2# Product 3# Comparator 1# Comparator 2# Comparator 3# | 1:3.72 1:3.66 1:3.76 1:3.18 1:3.39 1:4.01 | Pass Pass Pass Fail Pass Fail |
| Static load | Take the hose with a length of more than 200 mm and place it at 20-27° C. for more than 1 hour. The size of the pressing block is: 305 (arm)*63.5* 12.7 mm. Press the hose in the middle of the hose at a speed of 12.7 mm/min until the deformation rate of about 25%, holding for 30 seconds, recover for 30 min after removing the load, then measure the deformation rate of the hose. The deformation rate is calculated as a percentage of reducing = (original diameter − diameter after deformation)/original diameter. | ≤10% | Product 1# Product 2# Product 3# Comparator 1# Comparator 2# Comparator 3# | 2.29% 1.85% 1.01% 7.8% 9.3% 10.01% | Pass Pass Pass Pass Pass Fail |
| Natural hanging | Take a hose with a length of 500 mm, let go for 5 seconds after stretching, and measure the hanging value. | ≤600 mm | Product 1# Product 2# Product 3# Comparator 1# Comparator 2# Comparator 3# | 505 mm 512 mm 510 mm 580 mm 601 mm 620 mm | Pass Pass Pass Pass Fail Fail |
| Hanging test | Hang a hose joint with a weight of 20 Kg for 1 min. The joint does not fall off and the hose body does not crack. | Hang with a weight of 20 Kg for 1 min. The joint does not fall off and the hose body does not crack. | Product 1# Product 2# | No falling off of joint and no cracking of the hose body No falling off of joint and no cracking of the hose body | Pass Pass |

TABLE 3-continued

| Experiment Purpose | Type test | | | Test Result/ | Test environment<br>Indoor temperature (° C.)<br>23-27<br>Indoor relative humidity (%)<br>63 |
|---|---|---|---|---|---|
| Test Item | Test Method | Standard | Sample No. | Phenomenon | Judgment |
| | | | Product 3# | No falling off of joint and no cracking of the hose body | Pass |
| | | | Comparator 1# | Falling off of joint and cracking of the hose body | Fail |
| | | | Comparator 2# | No falling off of joint and no cracking of the hose body | Pass |
| | | | Comparator 3# | No falling off of joint and no cracking of the hose body | Pass |
| Temperature rise test | Take an entire hose, connect two wires and connect them to a sliding rheostat, adjust the voltage to 120 V, 50 Hz, 1.5 A and record the temperature when the hose temperature is stable. | ≤35° C. | Product 1#<br>Product 2#<br>Product 3#<br>Comparator 1#<br>Comparator 2#<br>Comparator 3# | 27° C.<br>26° C.<br>28° C.<br>30° C.<br>35° C.<br>37° C. | Pass<br>Pass<br>Pass<br>Pass<br>Pass<br>Fail |

As shown from Table 3, the stretch ratio of the hose in the present application is set to 1:3.2≤x≤1:4, so that the hose in this application has a sufficient expansion and contraction performance; when it is hung naturally, the stretched length will not be too large, which makes it more convenient to hang and store when it is not in use, saving the space.

In addition, after testing, the copper content, conductivity and strength of the whole (i.e., copper-clad steel) formed after the conductive layer 12 is cladded on the inner core 13 in this application are as follows:

| Copper content (%) | Conductivity (%) | Strength (Mpa) |
|---|---|---|
| 1.3 | 1 | 86.7 |
| 9.8 | 7.5 | 650 |
| 19.5 | 15 | 1300 |
| 23 | 17.7 | 1535 |

Apparently, embodiments described herein are only a part rather than all of the embodiments of the present invention. All other embodiments obtained by those of ordinary skill in the art without creative work based on the embodiments herein shall fall within the scope of protection of the present invention.

What is claimed is:

1. A telescopic hose, comprising:
an elastic support member that is configured to conduct electricity, wherein the support member comprises a first wire (1) and a second wire (2), and the first wire (1) and the second wire (2) are arranged in a double helix structure in cooperation with each other;
a hose wall (3) that is wrapped around the outer side of the support member, wherein the first wire (1) and the second wire (2) are separated from each other by the hose wall (3) and at least part of the hose wall (3) between the first wire (1) and the second wire (2) forms a corrugated portion (31) on the inner side of the hose wall (3) when the hose is in a contraction state;
wherein two corrugated portions (31) located on both sides of the second wire (2) abut against each other, while two corrugated portions (31) located on both sides of the first wire (1) do not abut against each other.

2. The telescopic hose according to claim 1, wherein first wire (1) comprises an inner core (13), a conductive layer (12) arranged on the inner core (13), and an insulating layer (11) that is wrapped outside the conductive layer (12).

3. The telescopic hose according to claim 2, wherein the inner core (13) comprises at least the following components: carbon, manganese, sulfur, phosphorus and silicon; the mass percents of components in the inner core (13) are:
carbon 0.42-0.5%;
manganese 0.5-0.8%;
sulfur ≤0.035%;
phosphorus ≤0.035%;
silicon 0.17-0.37%.

4. The telescopic hose according to claim 2, wherein the diameter of the inner core (13) is in the range of 0.935 mm to 0.965 mm.

5. The telescopic hose according to claim 2, wherein the thickness of the conductive layer (12) is in the range of 0.035 mm to 0.065 mm.

6. The telescopic hose according to claim 2, wherein the insulating layer (11) is made of a rubber material.

7. The telescopic hose according to claim 2, wherein the conductive layer (12) is made of a copper metal material and is formed on the inner core (13) through one or more of the processes of electroplating, coating, hot casting, hot dipping or electroforming.

8. The telescopic hose according to claim 7, wherein a copper content in the conductive layer (12) is ≥99.5%.

9. A process technology of a telescopic hose, comprising:

S1, making a first wire (1) and a second wire (2), arranged in a double helix structure to form a support member;

S2, stretching and unfolding the support member, and wrapping a rubber strip around the outer side of the first wire (1) and the second wire (2) to form a hose wall (3);

S3, releasing the support member so that the support member shrinks under the action of own elastic force and a corrugated portion (31) is formed on the inner side of the hose wall (3);

wherein the first wire (1) and the second wire (2) are separated from each other by the hose wall (3); and two corrugated portions (31) located on both sides of the second wire (2) abut against each other, while two corrugated portions (31) located on both sides of the first wire (1) do not abut against each other.

\* \* \* \* \*